United States Patent [19]
Müller

[11] Patent Number: 5,617,652
[45] Date of Patent: Apr. 8, 1997

[54] FASTENER INSTALLATION AND METHOD

[75] Inventor: Rudolf R. M. Müller, Frankfurt, Germany

[73] Assignee: Multifastener Corporation, Detroit, Mich.

[21] Appl. No.: 157,991

[22] Filed: Nov. 24, 1993

Related U.S. Application Data

[60] Continuation-in-part of Ser. No. 92,593, Jul. 16, 1993, which is a division of Ser. No. 888,580, May 26, 1992, Pat. No. 5,237,733, which is a continuation-in-part of Ser. No. 806,172, Dec. 12, 1991, Pat. No. 5,146,672, which is a division of Ser. No. 457,060, Dec. 26, 1989, Pat. No. 5,072,518, which is a division of Ser. No. 271,123, Nov. 14, 1988, Pat. No. 4,893,394, which is a division of Ser. No. 111,966, Oct. 21, 1987, Pat. No. 4,831,698, which is a continuation-in-part of Ser. No. 69,804, Aug. 17, 1987, Pat. No. 4,810,143, which is a division of Ser. No. 869,507, Jun. 2, 1986, Pat. No. 4,700,470, which is a division of Ser. No. 657,570, Oct. 4, 1984, Pat. No. 4,610,072, which is a continuation-in-part of Ser. No. 563,833, Dec. 21, 1983, Pat. No. 4,555,838, which is a continuation-in-part of Ser. No. 504,074, Jun. 14, 1983, Pat. No. 4,543,701, and Ser. No. 485,099, Mar. 28, 1983, Pat. No. 4,459,073, said Ser. No. 504,074, Jun. 14, 1983, Pat. No. 4,543,701, is a continuation of Ser. No. 229,274, Jan. 28, 1981, abandoned, said Ser. No. 485,099, Mar. 28, 1983, Pat. No. 4,459,073, is a division of Ser. No. 229,274, Jan. 28, 1981, abandoned.

[30] Foreign Application Priority Data

Feb. 2, 1980 [DE] Germany ............................. 3003908
Nov. 25, 1992 [DE] Germany ......................... 42 39 584.1

[51] Int. Cl.⁶ .......................... A43B 5/00; A43C 15/16
[52] U.S. Cl. ................... 36/134; 36/67 D; 36/127
[58] Field of Search ................. 36/134, 62, 65, 36/67 D, 127, 67 R

[56] References Cited

U.S. PATENT DOCUMENTS

| | | | |
|---|---|---|---|
| 1,954,761 | 4/1934 | Wiggin | 36/67 D |
| 1,976,019 | 10/1934 | Heim . | |
| 1,982,588 | 11/1934 | Bartell | 36/67 D |
| 2,089,459 | 8/1937 | White | 36/67 D |
| 2,258,734 | 10/1941 | Brady | 36/67 D |
| 2,456,118 | 12/1948 | Foster . | |
| 2,521,505 | 9/1950 | Doyle . | |
| 2,682,714 | 7/1954 | Phillips | 36/59 |
| 3,010,199 | 11/1961 | Smith et al. | 29/509 |
| 3,040,449 | 6/1962 | Phillips | 36/67 D X |
| 3,081,497 | 3/1963 | Scherry | 18/59 |
| 3,204,347 | 9/1965 | Snow | 36/134 X |
| 3,237,323 | 3/1966 | MacNeill | 36/59 |
| 3,299,500 | 1/1967 | Double . | |
| 3,436,803 | 4/1969 | Sarnoff . | |
| 3,715,423 | 2/1973 | Dunn | 264/250 |
| 3,735,507 | 5/1973 | Granger | 36/59 |
| 3,738,026 | 6/1973 | Granger | 36/127 X |
| 3,754,731 | 8/1973 | Mackal et al. | 251/145 |
| 3,800,401 | 4/1974 | Jesevich et al. | 29/432.2 |
| 3,871,264 | 3/1975 | Hallock | 85/30 |
| 3,926,236 | 12/1975 | Pouch et al. | 151/41.73 |
| 3,938,239 | 2/1976 | Lauth | 29/512 |
| 4,018,257 | 4/1977 | Jack | 151/41.72 |
| 4,039,099 | 8/1977 | Boxall | 220/91 |

(List continued on next page.)

FOREIGN PATENT DOCUMENTS

| | | | |
|---|---|---|---|
| 920847 | 12/1954 | Germany | 29/243.519 |
| 8137066 | 5/1982 | Germany . | |
| 3624609 | 2/1987 | Germany . | |
| 3722760 | 1/1988 | Germany . | |
| 2092881 | 8/1982 | United Kingdom | 36/127 |
| 2160146 | 12/1985 | United Kingdom | 36/134 |
| 2248762 | 4/1992 | United Kingdom | 36/134 |

OTHER PUBLICATIONS

*Industrie-Anzeiger*, article entitled "Nieten ohne Verlochen", 107th year, No. 42, dated May 24, 1985, p. 44.

*Primary Examiner*—Ted Kavanaugh
*Attorney, Agent, or Firm*—Howard & Howard

[57] ABSTRACT

A sheet metal part with at least one element introduced by a riveting process wherein the passage opening of the nut element is closed off by a stamped-out slug.

15 Claims, 7 Drawing Sheets

U.S. PATENT DOCUMENTS

| | | | |
|---|---|---|---|
| 4,092,773 | 6/1978 | Donahue | 29/512 |
| 4,193,333 | 3/1980 | Hallock | 85/31 |
| 4,306,360 | 12/1981 | Hagger | 36/67 D X |
| 4,459,073 | 7/1984 | Muller | 411/176 |
| 4,492,047 | 1/1985 | Arff | 36/62 X |
| 4,555,838 | 12/1985 | Müller | 29/432.1 |
| 4,711,021 | 12/1987 | Müller | 29/798 |
| 4,911,592 | 3/1990 | Müller | 411/181 |

FASTENER INSTALLATION AND METHOD

RELATED APPLICATIONS

This application is a continuation-in-part application of co-pending application Ser. No. 08/092,593, filed Jul. 16, 1993, still pending which is a divisional application of Ser. No. 888,580, filed May 26, 1992, now U.S. Pat. No. 5,237,733, which was a continuation-in-part of Ser. No. 806,172, filed Dec. 12, 1991, now U.S. Pat. No. 5,146,672, which application was a division of Ser. No. 457,060, filed Dec. 26, 1989, now U.S. Pat. No. 5,072,518, which was a division of Ser. No. 271,123, filed Nov. 14, 1988, now U.S. Pat. No. 4,893,394, which was a division of Ser. No. 111,966, filed Oct. 21, 1987, now U.S. Pat. No. 4,831,698, which was a continuation-in-part of Ser. No. 069,804, filed Aug. 17, 1987, now U.S. Pat. No. 4,810,143, which was a division of Ser. No. 869,507, filed Jun. 2, 1986, now U.S. Pat. No. 4,700,470, which was a division of Ser. No. 657,570, filed Oct. 4, 1984, now U.S. Pat. No. 4,610,072, which was a continuation-in-part of Ser. No. 563,833, filed Dec. 21, 1983, now U.S. Pat. No. 4,555,838, which was a continuation-in-part of Ser. No. 504,074, filed Jun. 14, 1983, now U.S. Pat. No. 4,543,701 and a continuation-in-part of Ser. No. 485,099, filed Mar. 28, 1983, now U.S. Pat. No. 4,459,073. Ser. No. 504,074 was a continuation of Ser. No. 229,274, filed Jan. 28, 1981, now abandoned and Ser. No. 485,099 was a divisional application of Ser. No. 229,274. Ser. No. 229,274 claims priority to an application filed in the Federal Republic of Germany, No. 3,003,908, filed Feb. 2, 1980.

This application also claims priority to an application filed in the Federal Republic of Germany, No. P42 39 584.4, filed Nov. 25, 1992.

BACKGROUND OF INVENTION

The present invention relates to a sheet metal part having at least one nut element introduced by a riveting process. Such sheet metal parts are well-known in practice and are for example shown in German patent specification 34 47 006, 34 46 978 and in DE-OS 30 16 675.

In the German patent specification 34 47 006, the nut element is formed as a pierce and rivet nut. For this purpose, the nut element has a nut part and a tubular pierce and rivet section which merges via an outwardly directed ring shoulder into the nut part. The nut element is introduced into the sheet metal by means of a stamping head and, indeed, the sheet metal is first pierced by the pierce and rivet section, whereby a stamped slug arises due to the hollow shape of the pierce and rivet section. The tubular pierce and rivet section is subsequently driven through the sheet metal and formed into a turned-over rivet flange at the side of the sheet metal remote from the nut part so that the sheet metal is arranged in form-fitted manner between the turned-over rivet flange and the ring shoulder. Raised features or ribs in the region of the ring shoulder of the nut element are pressed into the sheet metal during this insertion process and form a security against rotation of the nut element, so that on the insertion of a bolt the nut element does not turn relative to the sheet metal.

As can be read in the German patent specification 34 47 006, the stamped slug has to be removed to enable the nut element to be used at all for the intended purpose. This is achieved in that an injection pin is pushed through the threaded bore of the nut element and thereby pushes the slug out of the deformed pierce and rivet section.

Starting from a sheet metal part or a method of the initially named kind, the invention is based on the object of providing a sheet metal part which is particularly suited to be embedded into an injection molded part in that an injection molding composition is injection molded around the sheet metal part, with the plastic composition not penetrating into the thread of the nut element.

It would be possible to satisfy this object in that the nut element is closed off in the injection molding die on both sides, for example, through confronting wall parts of the injection molding die or through special inserts which lie flush against the two end faces of the inserted nut element. This would, however, lead to restrictions in the layout of the injection molding die and to considerable extra complexity and cost so that it can also be seen as a general part of the object underlying the invention to provide greater freedom in the layout of injection molded parts with embedded sheet metal nut elements and also to reduce the complexity and cost in realizing the injection molding and the injection molded part.

BRIEF SUMMARY OF THE INVENTION

In order to satisfy these objects, provision is made in accordance with the invention, and with a sheet metal part of the initially named kind, that the passage opening of the nut element is closed off by a stamped slug.

The stamped slug is generated with particular advantage during the introduction of the nut element into the sheet metal and is so deformed that it at least substantially seals off and is preferably held in form-fitted manner in the pierce and rivet section of the nut element. A solution would also be conceivable in which a disc, which is preferably generated by a stamping process and can thus be considered as a stamped slug, is manufactured in its own right and is subsequently inserted as a type of "cover" into a nut element which has been previously, or is subsequently, riveted to the sheet metal part. In this case, the sheet metal part is advantageously pre-apertured. This is in particular frequently necessary with thicker sheet metal parts in the form of plates or panels when the corresponding plate or panel does not permit the use of a self-piercing nut. It would also be conceivable to introduce the stamped slug in this way not into the pierce and rivet section of the nut element, but rather into the opposite end of the nut element, so that the bolt which is inserted is not inserted from the nut side into the nut element but rather from the side of the turned-over rivet flange.

Through the closing of the nut element at one end, it is possible to arrange the sheet metal part with the nut element in an injection molding die in such a way that either the one wall of the injection molding die or a surface of an insert part comes into flush contact with the nut element at the open side of the thread, whereby the penetration of the injection molding composition into the thread can be prevented. Since the other respective end of the thread is sealingly closed by the stamped slug, a great degree of freedom results in the layout of the injection molding die and the shaping of the injection molded part. This is so since neither the die wall nor an insert must be present at the end of the nut element closed by the stamped slug in order to prevent the penetration of the injection molding composition into the thread. Special shapes of the sheet metal part with the inserted nut element with stamped slug are to be found in the subordinate claims.

The holding of the stamped slug in the nut element by a substantially conical formation of the hollow turned-over end of the rivet which converges away from the stamped slug at the side of the nut element remote from the thread, and also an arrangement in which the diameter of the stamped slug is greater in the in-built state than the outer diameter of the thread, are particularly important, since in this way the stamped slug is held so that it cannot fall out.

An arrangement in which the stamped slug is accommodated in a ring space of the stamped slug or of the turned-over rim of the rivet and at least substantially seals off the passage opening of the nut element is also particularly preferred. For this purpose, it is advantageous for the stamped slug to exert a permanent compressive pressure onto the inner wall of the nut element, preferably onto the base of a ring groove which arises within the pierce and rivet section during the formation of the turned-over rivet flange. In this way, not only is the sealing action of the stamped slug reliably ensured, but also no danger of deformation under the pressure of the injection molding composition is to be expected. In other respects, a loosening of the nut element during the application of torque or bending moments is not to be feared because the stamped slug which exerts a compressive pressure ensures a firmer seat of the nut element.

In manner known, per se raised features, for example in the form of ribs and/or recesses, are provided on the ring shoulder of the nut element, which, after the introduction of the sheet metal element, form corresponding recesses or raised features of the sheet metal and cooperate with these to form a security against rotation.

The nut element is preferably so secured to the sheet metal part that the turned-over rim of the rivet is arranged in a recess of the sheet metal part. In practice, the recess of the sheet metal extends approximately conically and merges in the region of the ring shoulder of the nut element into a base surface of the recess which is directed approximately parallel to the flange, with the passage opening for the pierce and rivet section of the nut element being formed in the base surface.

The turned-over rivet flange can be sunk within the recess; i.e., the end surface of the rivet flange lies beneath the plane of the sheet metal at the side of the rivet flange. The turned-over rivet flange can however also be flush with this plane or indeed project above the said plane.

It is particularly favorable with a flush or sunk arrangement of the turned-over rivet flange that only a relatively thin layer of the injection molded composition must be present at this side of the sheet metal in order to completely seal off the sheet metal from this side and to protect it from corrosion. In other respects, the recess leads to a local stiffening of the sheet metal and also increases the loadability of the nut element in the sense that higher forces can be introduced from the nut element into the sheet metal without destroying the connection.

The said base of the recess can, for example, merge into the finished connection with the nut element into an axially connected collar. Moreover, at least a substantial part of the base and of the collar which is optionally formed therein can be arranged in form-fitted manner in a ring recess of the nut element between the ring shoulder and the turned-over rivet flange.

The invention also includes an injection molded part which is molded around the sheet metal part; i.e., the injection molding composition partly surrounds the sheet metal part, with the thread of the nut element being freely accessible from the outer side; i.e. not being covered over by the injection molded composition and serving to receive a screwed in part.

An example for the injection molded part would be the sole of a sporting shoe, with the nut element or nut elements being formed for the mounting of parts, such as spikes or studs which are, in particular, interchangeable. In this example, one can select a corrugated or perforated piece of spring steel for the sheet metal part, which ensures a flexibility of the sole. By way of example, the sole could be made of a spring-hard steel strip of high flexibility with a corrugated form (sinus wave) with an amplitude of (cat 3 mm and a field width of 8 mm. The injection molding composition is in this case realized as a plastic or opposition.

Another example for the injection molded part would be a plastic coachwork part with the nut element or the nut elements, for example, serving for the mounting of a hinge or for securing to other coachwork parts.

The invention also includes a method of manufacturing a sheet metal part with at least one nut element secured to the sheet metal part.

An important further development of this method lies in the fact that the sheet metal part with at least one nut element secured therein is removed from the piercing and riveting press and is inserted into an injection molding die with the thread of the nut element, or of each nut element, being closed at one side by the stamped slug and at the other side by contact of the end face of the nut part containing the thread against a wall part of the injection molding die, or against a part projecting into it, whereby the injection molding composition cannot penetrate into the thread. In other respects, positioning pins in the injection molding die can press against the stamped slug so that the respective nut elements are held against the wall part (or against an insert part of the injection molding die), with the turned-over rivet flange, which surrounds the positioning pins, preferably simultaneously cooperating with the positioning pins to ensure alignment of the sheet metal part in the injection molding die.

The invention will now be explained in more detail with reference to the drawings.

DETAILED DESCRIPTION OF THE INVENTION

Figure 1:
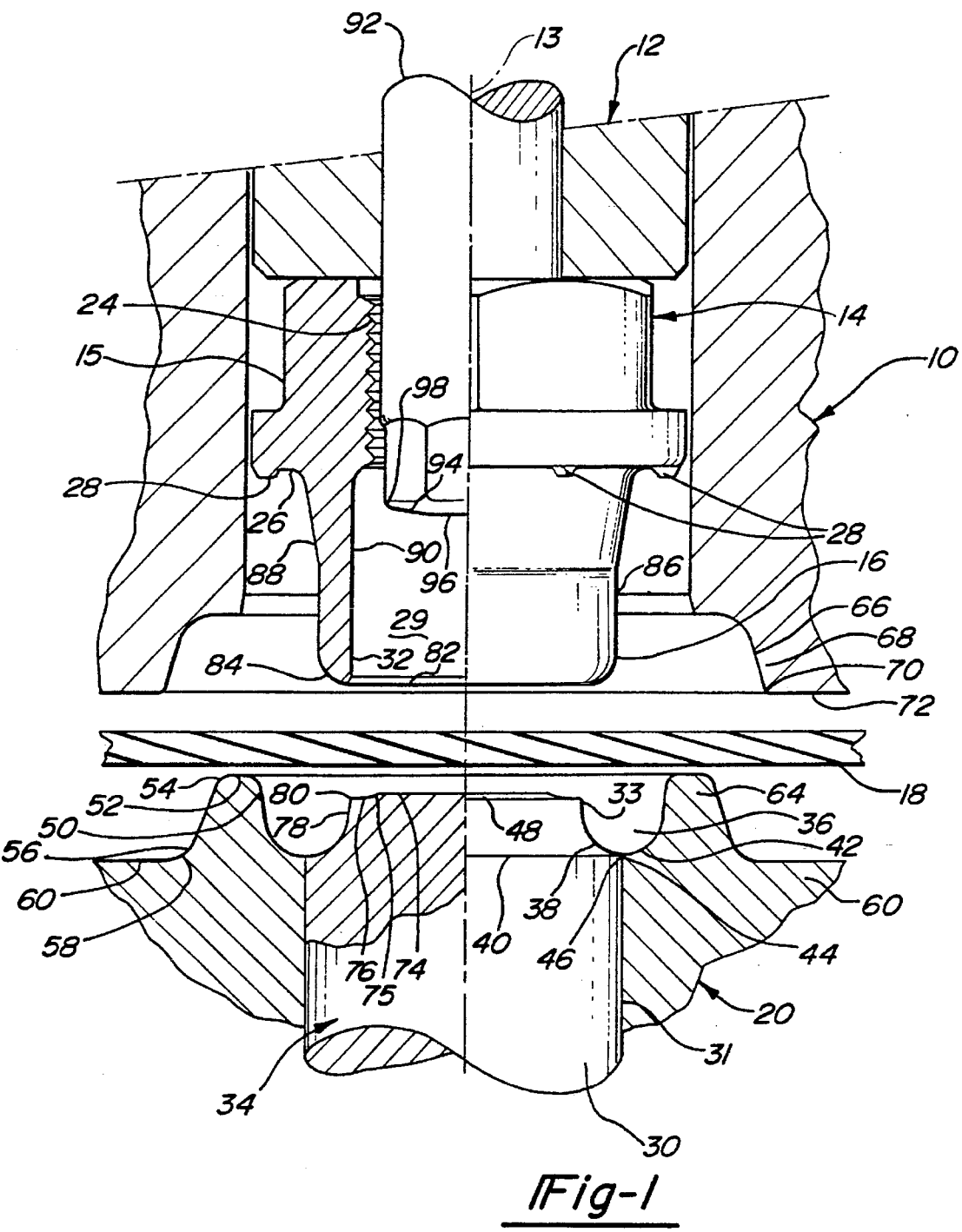
FIG. 1 a partial cross-section through a stamping head in the initial stage of a method of introducing a nut element into a sheet metal part by piercing and riveting.

FIG. 1 shows a section through a stamping head 10, which, in general, is formed in accordance with the stamping head of the German patent specification 34 46 978 and, above all, in accordance with the German patent specification 34 47 006 and which can be built into a stamping and/or embossing press with oppositely disposed plates which are movable relative to one another. FIG. 1 discloses the stamping head built into the upper press plate, it could however be built into the lower press plate or into an intermediate plate in just the same way.

The stamping head 10 contains a ram unit 12, which is able to stamp a fastener nut element 14 with a pierce and rivet section or panel portion 16 through a panel 18, a piece of sheet metal 18 is disclosed, which is held during the stamping movement between the stamping head 10 and the die button 20 as will later be explained in detail. The stamping head 10 is provided with a supply device (not shown) which is able to feed individual nut elements 14 into the stamping head and to bring them into the working position of FIG. 1. Such feed devices are known from the named prior art and will thus not be described here. Although the nut element 14 appears to hang in the air in FIG. 1 it is in practice held by resilient fingers or the like in the stamping head by friction so that it does not drop downwardly under its own weight.

As is evident from this drawing, above all from the cross-sectional drawing at the left hand side of the centerline 13 of the ram unit 12, the nut element 14 has a nut part or body portion 15 with an inner thread 24, and also the tubular pierce and rivet section 16 which adjoins the nut part and which merges via a radially outwardly directed ring shoulder 26 into the nut part. Ribs or noses 28 are provided on this ring shoulder which form a security against rotation. The action of these ribs or noses will be described later. The pierce and rivet section 16 of the nut element 14 has a ring-like hollow cavity or bore 29 which is coaxially aligned with the passage opening of the thread 24 and has at the lower end a rounded impact and drawing edge 32 at the end face of the pierce and rivet section.

At the side of the sheet metal part 18 remote from the stamping head 10, there is located a die button 20 which contains a cylindrical insert 30 which can also be termed a press mandrel. In this embodiment, the insert is non-displaceably but interchangeably arranged in the corresponding receiving bore 31 of the die button 20. The reference numeral 20 thus represents the actual die button and contains the insert. In some embodiments the die button 20 and the insert 30 are made in one piece. Which embodiment comes into use is ultimately a question of the cost related to the given application. Depending on the sheet material to be processed, the insert 30 is subjected to a greater or lesser degree of wear. It can thus be sensible to make the insert 30 as an exchangeable part when a high degree of wear is to be expected.

The axial end 33 of the insert 30 facing the sheet metal 18 has a smaller diameter than the guide or body part 34 of the insert and forms together with the die button 20 surrounding the insert a U-shaped ring groove or channel 36 which is open in the direction towards the sheet metal part 18. The ring groove forms a type of a recess the shape of which can be described as a half-toroid. The radially inner boundary of the groove 36 is formed by a rounded ring shoulder 38 of the insert which merges from the axial end 32 with the smaller diameter into the body part 34 via a gently rounded continuous transition, with this transition being completed at the axial position or ring edge 40 of the insert. The die button 20 has a ring-shaped recess 42 which corresponds to the shape of the ring shoulder 38 in an at least substantially mirror-image manner. The lowest point 44 of the ring-shaped recess 42 of the die button 20 however lies in the representation of FIG. 1 fractionally below the lowest point 46 of the U-shaped ring shoulder 38 of the insert 30, or is at most aligned with the corresponding ring edge 40.

The ring recess 42 of the die button 20 is continued in the embodiment of FIGS. 1 to 4 beyond the actual end face 48 of the insert and merges via a rounded ring shoulder 50 into a shallow ring-like region 52. The contour of the die button then merges via a further rounded ring shoulder 54 into a wall 56 which borders conically downwardly (in FIGS. 1 to 5) and rounds out at approximately the level of the line 40 via a further ring shoulder 58 into a surface 60 parallel to the sheet metal 18. This surface 60 then merges into the actual press surface of the tool which is used for the forming of the lower side of the sheet metal part 18.

The due button thus forms an annular raised portion around the insert which is characterized by the general reference numeral 64. As shown by the continuous centerline 13 the insert is coaxially aligned with the nut element 14 and the ram unit 12.

The stamping head 10 is provided with a circular recess 66 in a shape which is complementary to the shape of the outer boundary of the annular raised portion 64 of the due button, but which is, however, greater in diameter by about twice the thickness of the sheet metal part 18, so that on closing of the press space is provided for the sheet metal between the ring recess 66 and the annular raised portion 64. In other words the recess 66 has a conically extending wall part 68 which diverges downwardly and which merges via a ring shoulder 60 into a ring surface 72 parallel to the plane of the sheet metal 18. The ring surface 72 can then merge in correspondence with the ring surface 60 into the actual press surface of the tool, at least when the press is closed.

The actual end face 48 of the insert 30 has a plateau region 74 at the center which merges via an oblique preferably slightly arched chamfer 75 into an annular recessed shoulder 76. The shoulder 76 in turn merges into a steep wall section 78 of the ring shoulder 38 at the edge 80.

It is furthermore evident from FIG. 1 that the rounded impact and drawing edge 32 of the pierce and rivet section of the nut element has an oblique chamfer 82 at the radially inner side, for example at an angle to the centerline 13 of approximately 45°, and merges at the radially outer side via a gentle curve 84 into a cylindrical outer wall section 86 parallel to the cylindrical inner wall of the pierce and rivet section.

The cylindrical wall section 86 merges at approximately half height into a conically upwardly diverging section 88 which subsequently merges via a rounded portion into the ring shoulder 26. One notes also that the cylindrical inner wall 90 of the nut element has a larger diameter than the thread 24. Finally, one sees from FIG. 1 a punch insert or punch 92 which is fixedly arranged in the ram 12 and extends with radial clearance through the thread 24. As an alternative to this, a displacement movement of the punch insert 92 could be permitted, for example to facilitate the introduction of the individual nut elements 14, or for technical reasons during the later occurring movement of the ram unit 12 in the direction of the matrix insert. In this example the lower end of the punch insert 92 is of hexagonal shape and merges via a slight ring chamfer 94 into a central surface 96 parallel of the sheet metal part 18. Between the chamfer 94 and the outer wall of the punch insert 92 there is an annular rounded Portion 98.

The insertion of the nut element into the sheet metal part takes place at the same time as the sheet metal part is shaped in the press, as will now be described with reference to FIG. 1 and the further FIGS. 2, 3 and 4.

FIG. 1 shows an initial stage after the insertion of the sheet metal 18, before the press has completely closed; i.e., the upper press plate has been pressed down onto the lower press plate. Shortly before the closing movement of the press, a nut element is introduced beneath the ram 12 via a supply device and adopts the position shown in FIG. 1. The design of the supply head is adequately known from other documents, for example from the documents initially named here, and will not be explained further.

The stamping head is customarily restrictedly displaceably journaled in the press plate and is biased in the direction towards the sheet metal part. The ram unit is however coupled to the press plate at least during the closing movement. During the closing movement of the press the stamping head moves downwardly in the direction of the die button, and the ram 12 simultaneously moves downwardly so that the pierce end 32 of the pierce and rivet section of the nut element first indents the sheet metal under the pressure of the ram as is evident in FIG. 2. Through the indentation, the sheet metal part is held in the press against transverse displacement. At this stage, the stamping head 10, but not, however, the ram unit, moves back somewhat, while the closing movement of the press is continued. The nut element exerts a shearing action on the sheet metal under the pressure of the ram unit in conjunction with the fixed end of the insert 30 and cuts a circular stamped slug 100 out of the sheet metal.

Figure 2:
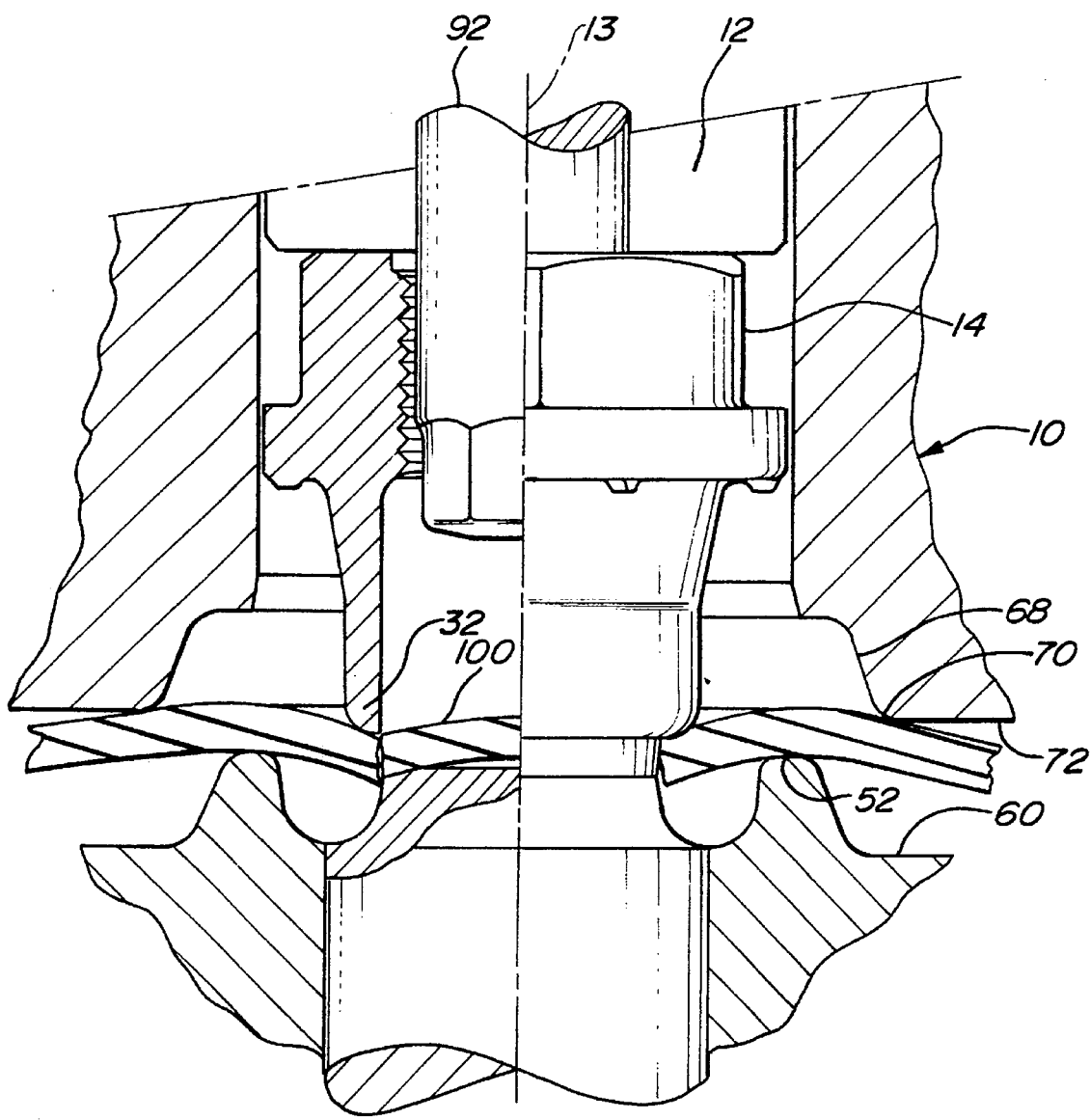
FIGS. 2 to 4 further stages of the piercing and riveting method.

FIG. 2 shows precisely the position of the tool in which the stamped slug 100 is formed. One notes that the stamped slug 100 is upwardly arched in the middle, which is to be attributed on the one hand to the shaping of the end face of the insert 30 and on the other end to the shearing action between the stamp and rivet section of the nut element and the insert 30. Stated more precisely, this arching of the stamped slug 100 results from the action of the cutting surface 82 of the pierce and rivet section and the cutting edge 33 of the insert 30, as already explained above.

Figure 3:
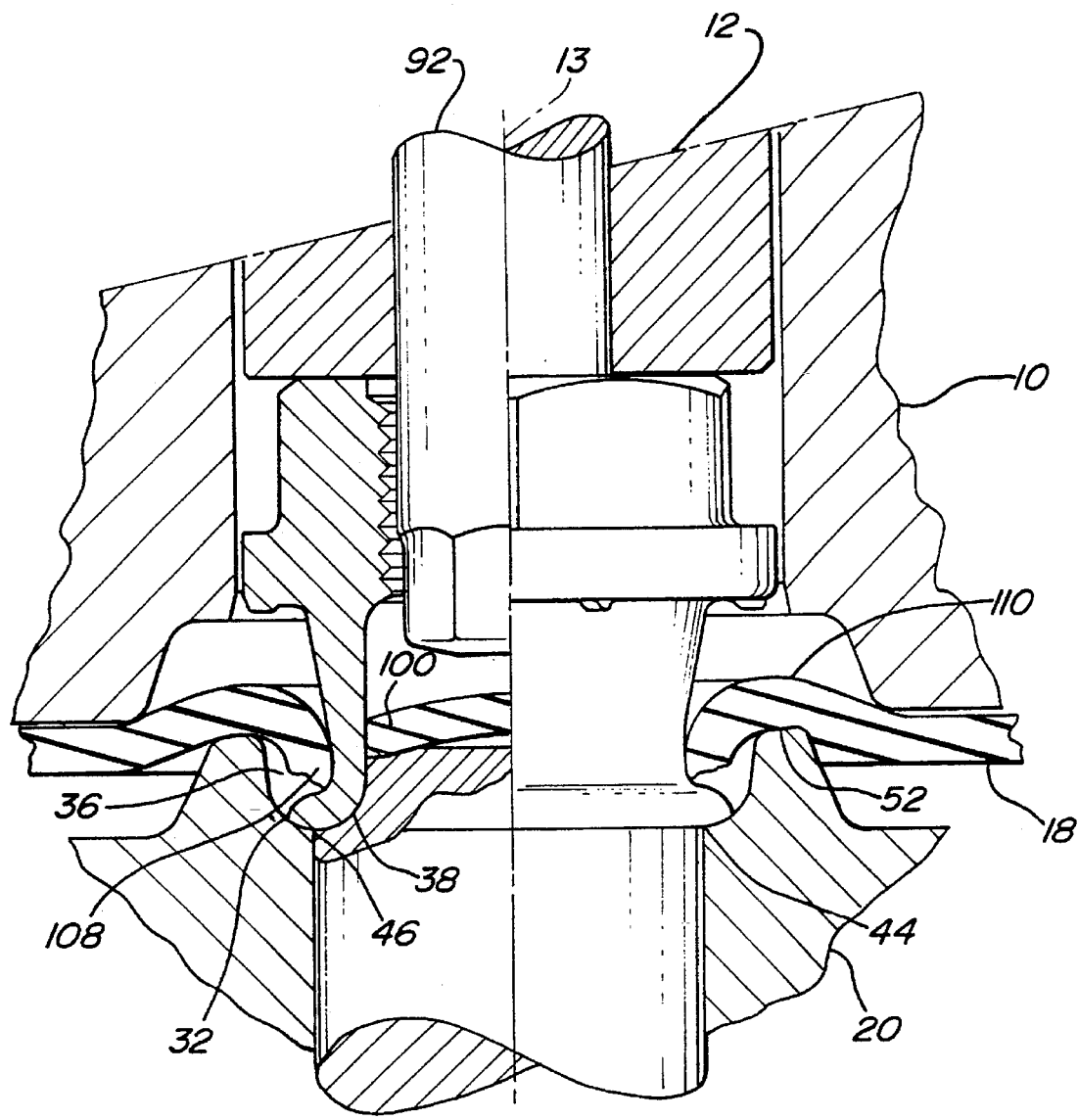

Through the contact of the sheet metal with the ring surface 52, and also with the rounded portion 70 at the transition to the conical wall 68 of the ring recess into the horizontal surface 72, the said indentation (i.e., a first deformation of the sheet metal 18) occurs, which is then continued in accordance with FIG. 3 during the further closing movement of the press 10. The ram unit 12 is also pressed further downwardly by this movement so that the pierce and rivet section of the nut element is driven through the hole which has arisen through the formation of the stamped slug. As a result of the ring shoulder 38, which acts as a rolling surface, the pierce and rivet section is deflected outwardly so that the impact and drawing edge 32 which is now somewhat deformed is now located in the part of the ring groove 36 which is formed by the die button 20.

Since the point 46 of the insert lies fractionally higher of the point 44, it is ensured, even with unfavorable tolerances, that no ring step is formed at this position which could hinder the outwardly directed movement of the impact and drawing edge of the pierce and rivet section of the nut element.

Since the pierce and rivet section of the nut element is driven through the hole formed in the sheet metal by the cutting out of the stamped slug a type of wedge action arises here which drives the sheet metal downwardly and outwardly, so that the sheet metal, as shown in FIG. 3, has a pronounced conical recess 108. As the upper press plate has been pressed further downwardly the sheet metal also has a more pronounced ring-like raised portion 110 above the ring-like surface 52 of the die button 20. It should be pointed out that to manufacture this ring-like raised feature not inconsiderable forces are necessary which must be supplied by the stamping head 10.

The stamped slug 100 is, as a result of the lowering of the stamping head, driven further into the cylindrical hollow cavity 90 of the pierce and rivet section of the nut element but does not yet however contact the end face of the punch 92.

Figure 4:
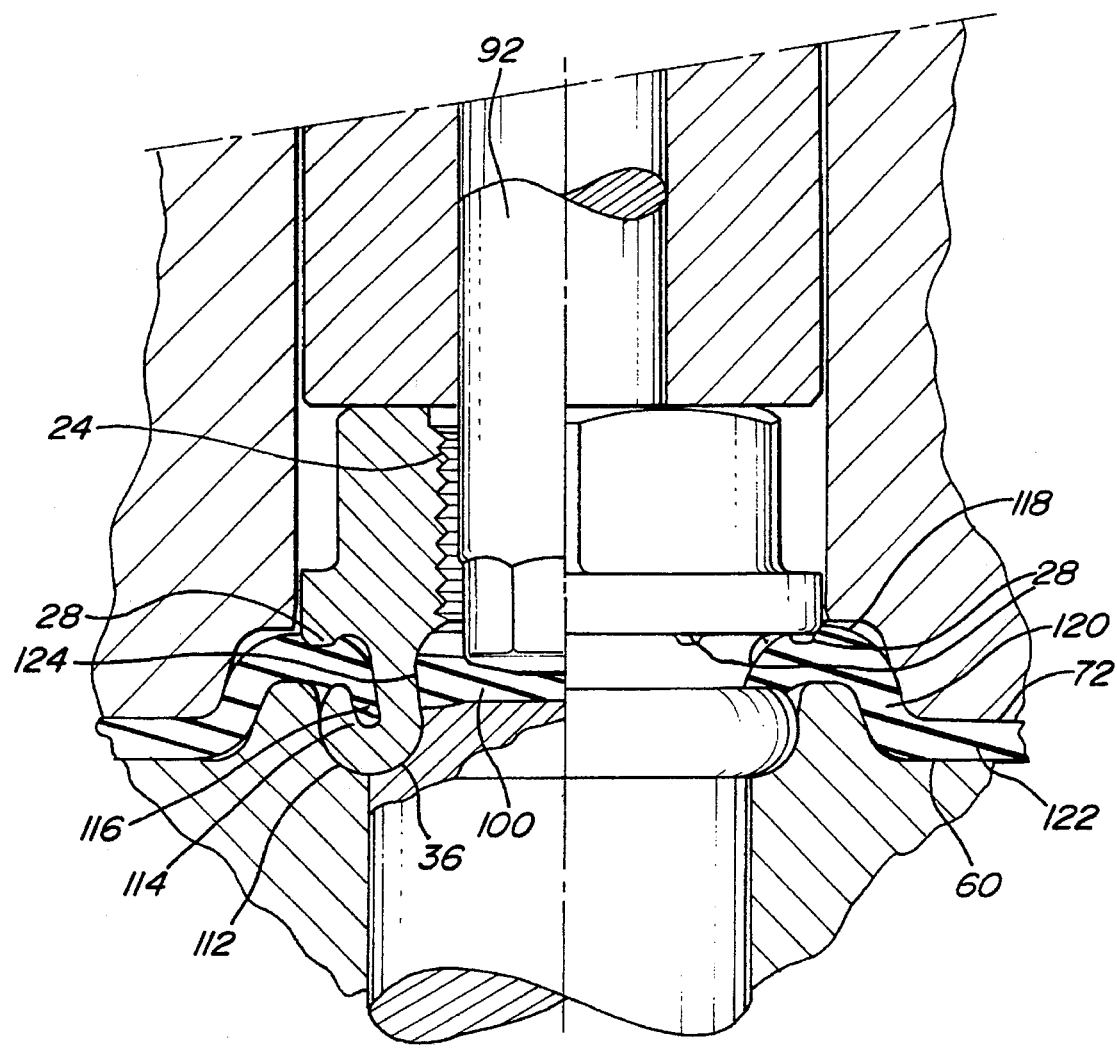

The downwardly directed movement of the stamping head or of the upper part of the press is continued and now not only presses the ram unit but also the stamping head, which has reached the end of its path of displacement, downwardly until the end stage of FIG. 4 is achieved. As can be seen in particular from the partly cut away left hand side of the drawing of FIG. 4, the pierce and rivet section 16 of the nut element is now formed by the U-shaped groove into a complete turned-over rivet flange which has an upwardly directed U-shaped ring recess 114 in which the material of the sheet metal around the hole produced by the cutting out of the stamped slug is received in the form of a downwardly directed cylindrical collar 116. Through the cooperation of the stamping head and also the die button, the sheet metal merges via a ring shoulder 118 into a conical downwardly broadening part 120, which subsequently merges into a flat region 122 of the sheet metal, the plane of which is determined by the surface 66 of the die button and the surface 72 of the stamping head. As the nut element has now been completely downwardly driven the noses or ribs 28 are located in corresponding recesses of the ring shoulder 118 of the sheet metal which have been formed by the downward pressing of the noses 28 and an enhanced security against rotation arises here which prevents turning of the nut element during later use.

The upwardly arched stamped slug in FIGS. 2 and 3 is first pressed flat and indented; i.e., compressed in this end stage by the end face of the punch, so that the material is pressed outwardly. When the punch 92 is displaceably journaled relative to the ram unit, and for example biased forwardly by a strong spring, then it can deflect rearwardly somewhat during the compression of the stamped slug. The outwardly directed movement of the material of the stamped slug resulting from the compressive action leads to a permanent compressive pressure between the outer ring edge 124 of the stamped slug and the inner wall of the pierce and rivet section 16 of the nut element. Furthermore, the inner wall of the pierce and rivet section is deformed by this compressive pressure; i.e., by the compression of the stamped slug, to a slightly downwardly converging surface so that the stamped slug cannot drop out downwardly. Through the compressive pressure it is also ensured that a very good seal is present here. The stamped slug can thus not be lost downwardly. It can however also not be lost upwardly because the thread 24 has a substantially smaller diameter than the wall part 124 of the pierce and rivet section against which the outer edge of the stamped slug is in sealing contact. After the opening of the press the sheet metal part with the pierced and riveted nut element can be removed from the press and conveyed out of the press.

In accordance with a first method variant, the manufacturing method of the sheet metal part 18 with the inserted nut element finishes at this stage on taking the sheet metal part out of the press.

Although the previous process has only been concerned with the insertion of a single nut element, a plurality of nut elements can be straightforwardly provided at different locations of the sheet metal part in the same way and means with one stroke of the press. The piercing of the sheet metal part by the nut element can however also take place differently than is described here. For example it is conceivable that the ram unit could be pressed downwardly via a stroke movement carried out separately from the closing movement of the press.

Figure 5:
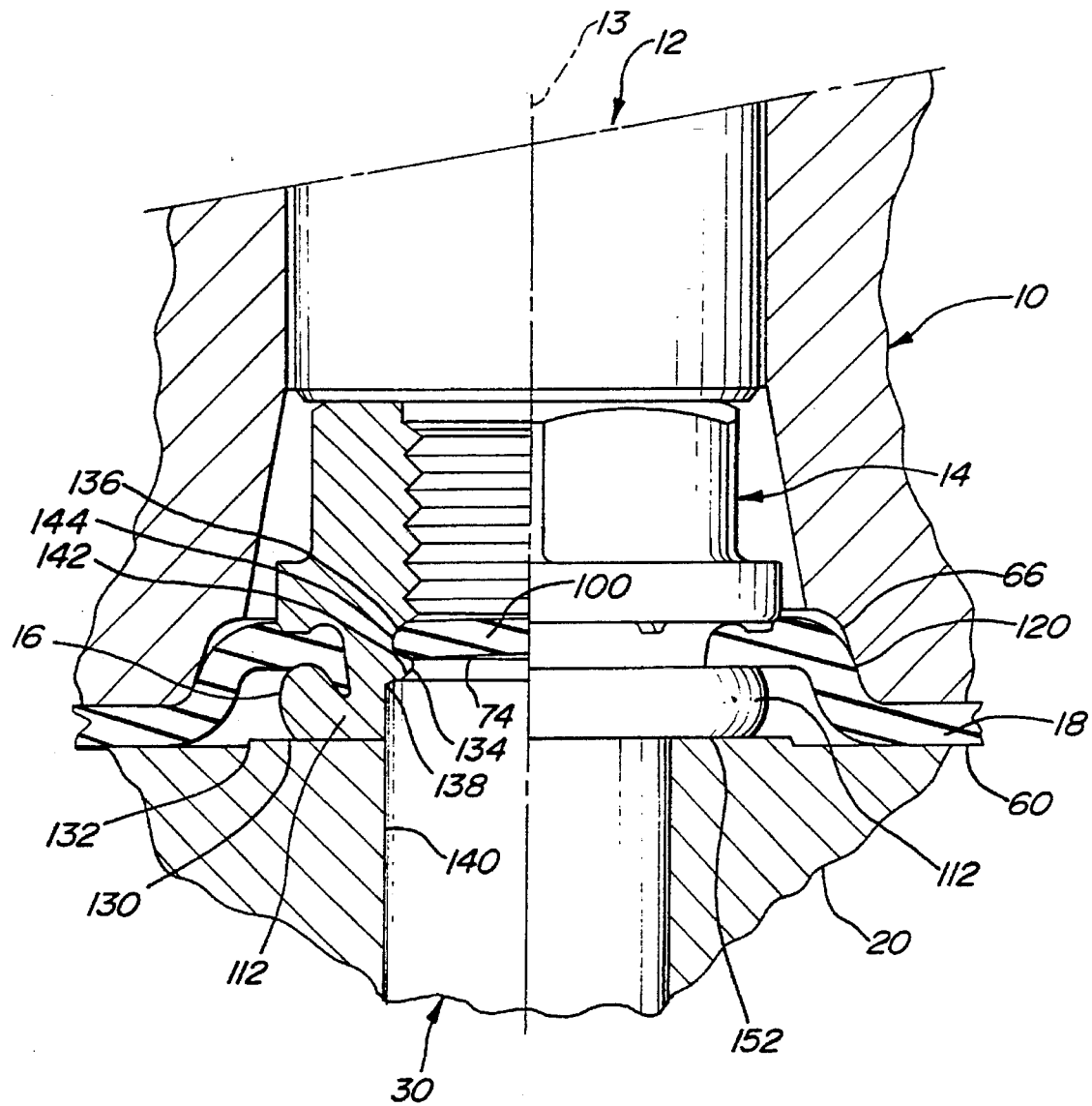
FIG. 5 a representation corresponding to that of FIG. 4 of the end stage of a modified riveting process with a somewhat different procedure.

Instead of terminating the method of manufacture with the opening of the press after the manufacturing step of FIG. 4, it can be advantageous to carry out a further manufacturing step as is shown in FIG. 5. The manufacturing step of FIG. 5 takes place with different tools than are shown for FIGS. 1 to 4. This manufacturing step of FIG. 5 can take place in a quite different press installation and can however also be carried out as a further step in a further station of the same press installation as was used for carrying out the method steps of FIG. 1 to 4; i.e., the press installation is laid out to use sequential step tooling.

FIG. 5 shows several possible method variants in one drawing. FIG. 5 in particular shows a possibility of more reliably framing the stamped slug within the nut element. Furthermore, FIG. 5 shows the possibility of pressing the rivet flange 112 flat. This is on the one hand interesting when, for example, the end face of the turned-over rivet flange 112 should lie within the recess 120 of the sheet metal part 18, or when, in a separate process the stamped slug 100 is not to be inserted at the position shown in FIG. 5, but rather in a ring space at the other end of the nut. In the latter case, the bolt which cooperates with the nut element should be introduced from the side of the turned-over rivet flange 112 and would customarily press a different sheet metal component against the turned-over rivet flange 112. In this case, the planar design of the rivet flange 112 leads to an enlargement of the surface transferring the clamping forces whereby an excessive surface pressure between the rivet flange 112 and the sheet metal part to be screwed on can be avoided, so that plastic deformation of the sheet metal part or of the rivet flange 112, or the settling effects of these parts as a result of excessive surface pressure need no longer be feared.

In the embodiment of FIG. 5, the die button 20 has a substantially planar surface 60 without a pronounced annular raised portion 64. In place of this the surface of the die button 20 which faces the sheet metal simply has a ring-shaped surface 130 which merges via a small step 132 into the planar surface 60. The ring surface 130 is parallel to the surface 60; i.e., to the plane of the inserted piece of sheet metal 18 of the earlier station (where the method steps were carried out in accordance with FIGS. 1 to 4). The insert 30 has a substantially cylindrical shape and merely has a rounded undercut 134 at the end face with the rounded undercut terminating in a planar surface 74 arranged perpendicular to the center line 13.

The ram unit 12 in this embodiment has no centrally arranged punch 92 as in the ram unit of the earlier station. The stamped slug 100 which is cut out from the sheet metal part 18, and which is arranged in FIG. 4 beneath the thread 24, is pushed upwardly under the action of the now present insert 30 until it abuts at the upper side against a ring shoulder 136 which is located directly beneath the thread 24 of the nut element 14.

The ring edge 138 of the insert 30 has a diameter at the position where the right cylindrical surface 140 of the insert merges into the rounded undercut 134 which is greater than the inner diameter of the cylindrical hollow cavity 90 in some regions of the pierce and rivet section 16 and which functions as a kind of shearing and reforming tool while the nut element 14 is pressed downwardly under the action of the ram unit 14. During this, an annular rim 142 is formed from the material of the pierce and rivet section 19 of the nut element. The result is that the stamped slug 100 is held under permanent compressive pressure in form-locked and sealed manner in a ring groove 144 with this ring groove 144 being formed in the upper region by the ring shoulder 136 of the nut element and in the lower region by the annular rim 142.

Since the die button 20 has the planar ring surface 130 around the insert 30, the rounded end face around the pierce and rivet section 16 of the nut element as obtained in accordance with the method step of FIG. 4 is pressed flat into a planar ring surface 152.

In this embodiment, it is not necessary to provide a punch insert 92, however, a punch insert of this kind can be selected at will if it should turn out in practice that a counter-pressure on the upper surface of the stamped slug 100 in FIG. 4 would be useful during the securing of the stamped slug 100.

It is also entirely possible to insert a circular disc which has been stamped out from a piece of sheet metal and which has the size of the stamped slug 100 using a punch with the form of the insert 30 of FIG. 5 prior to inserting the nut element 14 into the sheet metal part 18; i.e., to insert the slug 100 in a previous working step. A method of this kind is, for example, advantageous when the sheet metal part 18 is relatively thick, for example in the range from 3 to 7 mm which makes the use of self-piercing nut elements 14 difficult. With a relatively thick piece of sheet metal of this kind, the sheet metal 18 can be pre-apertured either with a special stamping tool or by a drilling process, so that the nut element is inserted into the previously formed hole and then riveted to the sheet metal part 18, for example in a press process as previously mentioned.

It should be pointed out here, that during the provision of a stamped slug in the riveting section, the diameter of the insert 30 (i.e., the diameter at the edge 134) should be selected to be slightly larger prior to insertion of the nut element than the diameter of the undeformed rivet section 16, so that sufficient material is present in order to form the annular rim 42.

The tool of FIG. 5 can also be used, optionally with small modifications, to insert a "foreign" stamped slug 100 into the end of the nut element remote from the pierce and rivet section. For this purpose, the corresponding end face of the nut element should be provided with a tubular projection similar to the pierce and rivet section, but somewhat shorter, whereby the matrix insert can then be pressed downwardly from above in order to press material downwardly from the wall of the tubular projection in order to generate a rim corresponding to the annular rim 142 which secures the stamped slug at this end face of the nut element. Following the formation of nut element in this way, the nut element can be stamped into a piece of sheet metal 18 in accordance with the method of FIGS. 1 to 4 and riveted to the latter, with the ram insert 92 then being omitted. As a subsequent method step, the turned-over rivet flange can also be pressed flat in accordance with FIG. 5, which would be entirely preferred here, since in this embodiment, the bolt which is inserted into the nut element is screwed in from the side of the rivet flange, will serve to press a piece of sheet metal against the flat end face of the rivet flange.

The use of the stamp with approximately the shape of the insert 30 in FIG. 5 has the advantage that the stamped slug 100 is firmly anchored in the annular groove 144 of the nut element 14 and that it cannot be lost under any circumstances, which is very important when the nut elements are already provided with such stamped slugs from the works of the manufacturer. It would namely be very undesirable for a stamped slug to be occasionally lost from nut elements with previously inserted stamped slugs 100, since this could cause catastrophic effects during the subsequent handling of the nut element. If, for example, a stamped slug 100 is lost when inserting a nut element into a press, then the lost stamped slug 100 could damage the sheet metal part or also the tool. If it is lost from the sheet metal part, then during the subsequent molding process, the molding composition would enter into the thread and the component would have to be scrapped. The flowing of the injection molding composition through the thread can also lead to the injection molding installation being contaminated or damaged.

When using nut elements with previously inserted stamped slugs, the possibility also exists of manufacturing the stamped slug 100 from a thinner piece of sheet metal than the sheet metal 18 into which the nut element is to be inserted.

Figure 6:
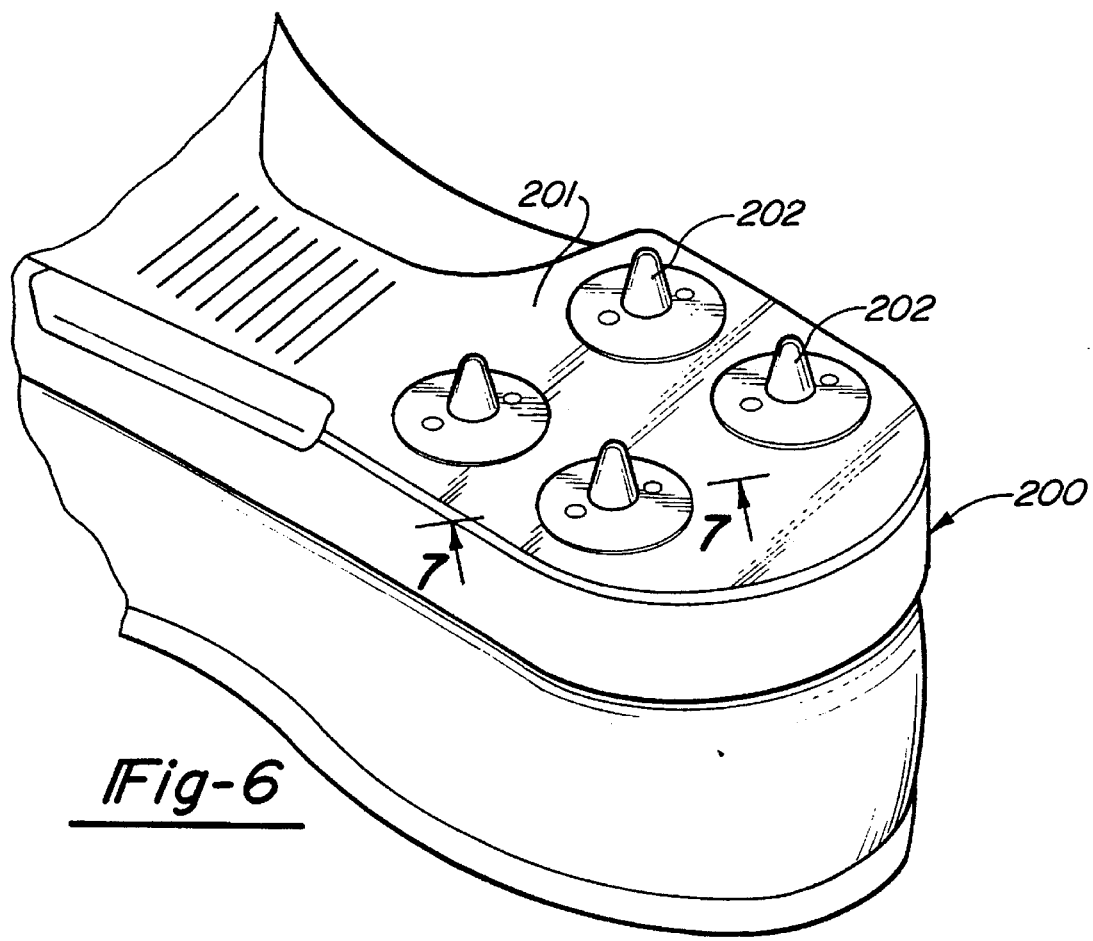
FIG. 6 a perspective partial illustration of a sporting shoe with spikes.

FIG. 6 shows an example of the use of the present invention for the sole 200 of a sporting shoe or of a golf shoe. The sole 200 consists of a plastic composition 201, or of rubber and has in its interior, as is evident from FIG. 7, a sheet metal part 18 which is provided with nut elements 14 (of which only one element can be seen in FIG. 7) which were inserted in accordance with the previously described method of FIG. 1 to 4. These nut elements 14 form threaded mounts for spikes or studs 202 which are screwed into the respective nut elements. In distinction to the previously described methods, no pronounced recessing of the sheet metal is provided in this example in the region of the individual nut elements. This requires a somewhat modified shape of the upper side of the and also of the lower side of the stamping head.

Figure 8:
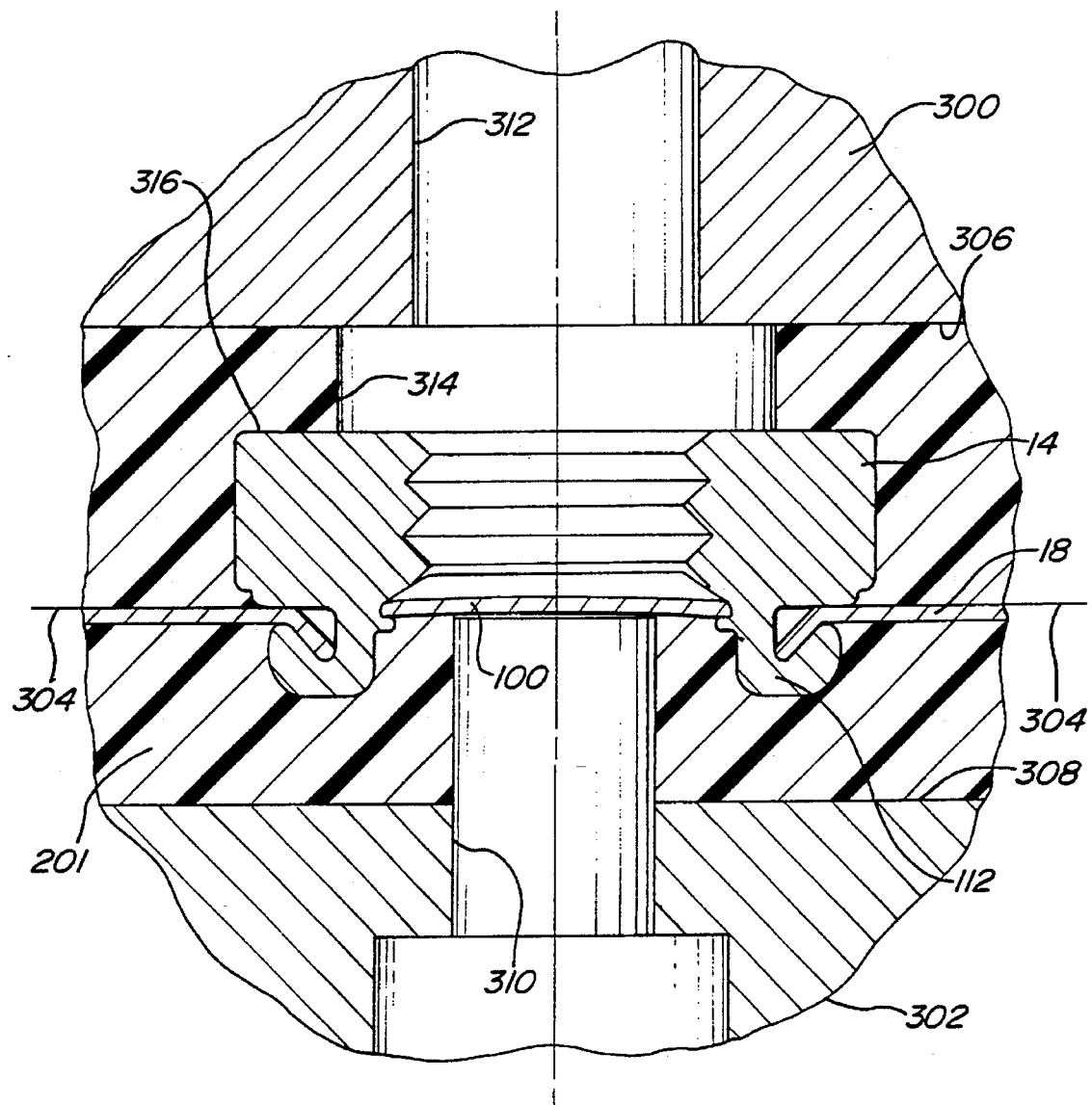
FIG. 8 an enlarged illustration of a section of a sheet metal part with inserted nut element in an only partially illustrated injection molding die for the introduction of the injection molding composition, wherein the injection molded part of FIG. 8 could also be used for the sole of a sporting shoe in accordance with FIG. 6 or FIG. 7.

The way in which the sheet metal part with the inserted nut elements is embedded in the plastic composition of the sole 200 is evident from FIG. 8.

Figure 7:
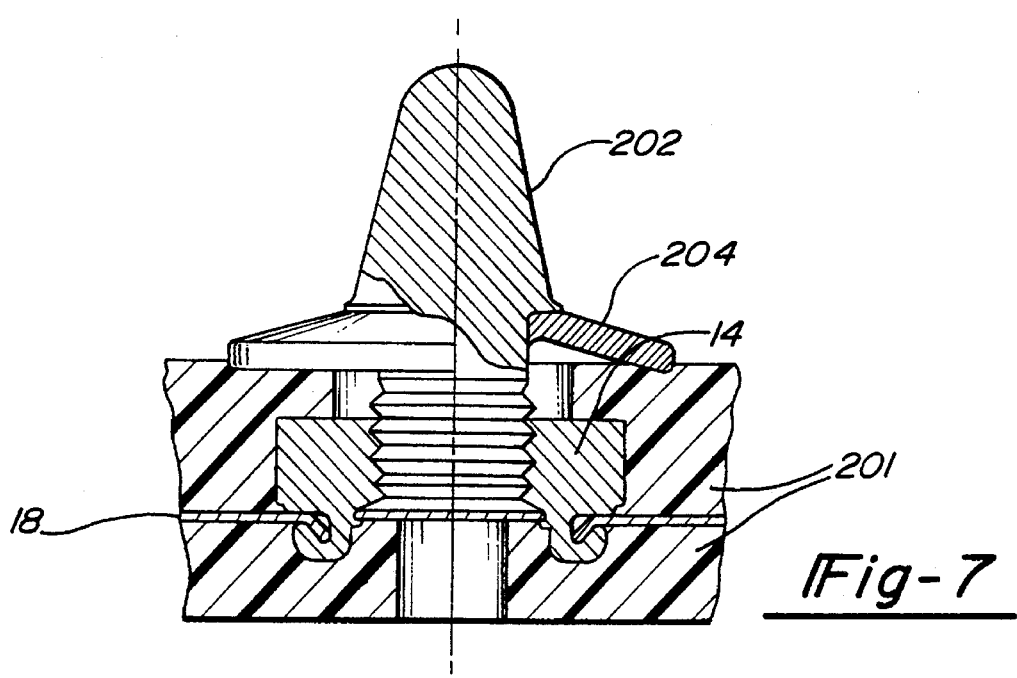
FIG. 7 a partial cross-section through the sole of the sporting shoe of FIG. 6 in the plane VII—VII in the region of one spike.

FIG. 8 shows only one part of an injection molding die in cross-section having upper and lower die parts 300 and 302 which fit together at a partition joint 304 and form respective hollow die cavities 306 and 308. The sheet metal part 18 with the inserted nut elements 14, of which only some are shown, sit in the hollow cavity of the injection molding die and are supported on pins, such as for example 310, which in this example are arranged beneath the respective stamped slugs 100. In this example, the turned-over rim 112 of the rivet, or barrel portion, satisfies a double-function in that it cooperates with the pins 310 and brings about a centering of the sheet metal part 18 in the injection molding die. If necessary, other centering devices can however also be provided. Above the nut part of the nut element 14 there is located a further die insert in the form of a pin 312 with a cylindrical head 314 which is arranged above the nut part and contacts the end face 310 of the nut part. The head 314 has a diameter which is admittedly greater than the core diameter of the thread, but is however smaller than the outer diameter of the nut part. As the stamped slug 100 is somewhat resilient, this design enables complete closing of the two halves of the injection molding die, even if the tolerances of the pins 310 and 312 should be somewhat unfavorable. After the closing of the injection molding die, the injection molding composition is injected into the die. It flows into all hollow cavities of the injection molding die; i.e., into the regions shown there by cross-hatching in FIG. 8. One notes that the injection molding composition surrounds a part of the other end surface of the nut part of the nut element 14. This has the advantage in a shoe sole that, on the one hand, penetration of moisture around of the nut part is made more difficult and, on the other hand, as shown in FIG. 7, a stud or spike can be so screwed in that a collar part 204 compresses the injection molding composition present between the stud and the nut element. This not only brings about better sealing, but rather also a security against rotation of the respective stud or spikes so that these cannot be lost.

The method of manufacturing the sole of a golf shoe will now be briefly described once again.

With a golf shoe sole, the sheet metal part can consist of 0,3 mm spring-hard strip steel of high flexibility. This strip steel is deformed simultaneously with the insertion of the nut elements in the press to a corrugated shape (sinewave) through corresponding profiling of the press plates. The waveform of the profiled sheet metal has an amplitude of ca. 3 mm and a field width (wavelength) of ca. 8 mm. A high elasticity of the spring-hard shoe sole is achieved by this profiling. The sheet metal part is then simultaneously stamped out at its outer periphery in the press so that it receives the shape of a foot print.

In order to receive the already described thread bearing spikes, the nut elements must be so secured to the formed sheet metal part (i.e., to the sole of the shoe) that they can withstand the deformations which occur during the course of each step (rolling off of the sole of the shoe on the ground).

At the point of connection nut/sole of the shoe, translatory movements accordingly occur between the nut elements and the sheet metal sole of the shoe. Through the described embodiment of the turned-over rim of the rivet with the measures providing security against rotation, it is ensured that these transnational movements do not exert any notch effects on the sheet metal of the shoe sole. The assembled molded sheet metal part comprising the nuts and the metal sole of the shoe is embedded into a plastic sole and is surrounded on all sides by this plastic or rubber material. During this, the inserted stamped slugs ensure that the threaded rear side of the nuts are so closed that no plastic or rubber material can penetrate into the threaded bore.

As explained, the thread entry is closed off by corresponding sealing measures in the plastic or rubber molding tool, such as through the pins 312 in the example of FIG. 8.

The sealing at the rear side of the thread is achieved, as stated, in that the pierce and rivet nut is not introduced into a prestamped openings of the steel sole of the golf shoe but rather in a self-piercing manner. As explained in detail above, the stamped slug which is thereby cut out from the hole is so positioned by a special tool punch construction in the turned-over rivet flange that it functions as a sealing cover against the penetration of the plastic/caoutchouc composition.

The installation steps are in detail:

a) In a suitable lower part of the tool (corresponding to the shape of the shoe sole), there are provided as many receiving cavities as there are nuts;

b) In the upper part of the tool, there is in the same number of the stamping buttons for the stamping in and the turning over of the rivet portions of the nuts, with the stamping buttons being located exactly above the receiving cavities for the nuts;

c) A fastener such as, for example RSF nut (obtainable from the company Profil), is positioned in each receiving cavity in the lower part by suitable supply means, with the pierce and rivet section pointing upwardly;

d) A sheet metal part which is non-apertured, but which has been pre-flattened, is placed on the nut elements, with the sheet metal part being held in form-fitted manner by the contour of the receiving mount of the tool;

e) Suitable checking measures ensure that the fasteners and the sheet metal part are in the installation position;

f) As the upper part of the tool passes through the lower dead point the nut elements have cut through the sheet metal part via the cutting and piercing action. A circular, ring-like, turned-over rivet flange is formed at each nut which holds the punched out slug through a relatively high clamping action (arching effect) as a cover in the pierce and rivet section and closes the rearward opening of the nut. After the upward travel of the upper part of the tool and removal of the shoe sole with the stamped-in and riveted-in nuts the methods steps for the assembly of the assembled component are terminated, whereupon the latter can be placed in an injection molding die and the embedding in the injection molding composition; i.e., in the selected plastic/caoutchouk material can take place;

g) Thereafter, the sole of the shoe together with the upper part of the shoe is formed into a finished shoe with subsequent screwing in of the spikes or studs.

Finally, it should be pointed out that the nut elements need not necessarily be of round cross-section, polygonal cross-sections are for example also entirely possible. It is also not absolutely essential that the nut elements must have threads, they could for example also have bayonet mounts. They should, in general, be considered to be hollow fastener elements.

I claim:

1. A molded part, comprising:

a panel having an opening therethrough;

a female fastener having a body portion mounted on said panel, a bore centered on an axis extending through said body portion from a first free end and to an integral annular retainer portion coaxially aligned with said bore extending through said panel opening and riveted to said panel, said bore extending from said open free end to a securing end defined by said integral annular retainer portion and spaced from said open end;

a disk-shaped slug formed as a separate part from said fastener secured in said body portion sealing said bore, and positioned axially between said first open free end and said securing end, said disk-shaped slug having been pierced from the panel and being the same material as the panel; and a molding material at least partially surrounding said panel portion with said female fastener body portion at least partially exposed and said annular retainer portion sealed in said molding material, said slug forming a barrier against said molding material, said molding material extending upwardly into said bore from said securing end toward said slug, said slug sealing said bore, such that said free end of said bore is free of said molding material.

2. The molded part defined in claim 1, wherein said molding material defines the sole of a sporting shoe, wherein said female fastener is adapted to receive interchangeable spikes.

3. A molded part comprising:

a panel having an opening therethrough;

a female fastener having a body portion mounted on said panel, a bore extending through said body portion and an integral annular retainer portion coaxially aligned with said bore extending through said panel opening and riveted to said panel;

a disk-shaped slug secured in said body portion sealing said bore, said disk-shaped slug having been pierced from the panel and being the same material as the panel;

a molding material at least partially surrounding said panel portion with said female fastener body portion at least partially exposed and said annular retainer portion sealed in said molding material; and said disk-shaped slug being retained in said annular retainer portion by an annular lip integral with said retainer portion overlying said disk-shaped slug.

4. A molded part comprising:

a panel portion;

at least one fastener coupled to said panel portion, said fastener having a body portion and an annular barrel portion extending front said body portion, said body portion having a free open end and a bore extending therethrough in generally coaxial alignment with an opening in said panel portion, said barrel portion and said panel portion being deformed together to lock said barrel portion and said panel portion together, said barrel portion being secured to said panel portion at a piercing end spaced from said free open end, said bore having an internal thread being freely accessible from said tree open end;

a molding material at least partially surrounding the panel portion, with said body portion being at least partially exposed and said barrel portion being concealed;

a slug secured within said opening of said barrel portion to prevent said molding material from flowing into said bore, said slug having been pierced from said panel portion and being of the same material as said panel portion, said slug being secured within said bore intermediate said free open end and said piercing end, said molding material extending upwardly into said bore toward said slug from said piercing end, said slug preventing movement of said molding material beyond said slug and toward said free open end.

5. The molded part of claim 4, wherein said molding material defines the sole of a sporting shoe, with said fastener being adapted to receive interchangeable spikes.

6. The molded part of claim 4, wherein said panel portion is corrugated spring steel.

7. The molded part of claim 4, wherein said sheet metal portion is apertured spring steel.

8. The molded part of claim 4, wherein said molded material defines the sole of a golf shoe.

9. The molded part of claim 4, wherein said slug is slightly larger than the interior diameter of said barrel portion such that said slug is wedged within said opening of said barrel portion.

10. The molded part of claim 4, wherein said barrel portion has an interior wall with an inwardly extending lip, said opening in said barrel having an inner diameter that is greater than the inner diameter of said bore, defining an offset between said opening in said barrel and said inner diameter, said slug being positioned between said lip and said offset.

11. The molded part of claim 4, wherein said slug is secured within said barrel a spaced distance from said free open end.

12. The molded part of claim 4, wherein said slug is secured within said barrel a spaced distance from said body portion.

13. The molded part of claim 4, wherein said fastener includes a shoulder extending outwardly from said fastener generally between said body portion and said barrel portion, said panel portion having opposed surfaces, with the shoulder engaging one surface and the deformed barrel engaging the opposite surface, wedging said panel portion between said shoulder and said deformed panel.

14. The molded part of claim 13, wherein said shoulder includes ribs which cooperate with corresponding raised features on said panel portion to resist rotation of said fastener.

15. The molded part of claim 4, wherein said panel portion includes a recess into which said deformed barrel portion is positioned.

* * * * *